No. 738,900. PATENTED SEPT. 15, 1903.
W. K. GIVEN.
AUTOMATIC CAR FENDER WITH BRAKE ATTACHMENT.
APPLICATION FILED JAN. 2, 1903.
NO MODEL.
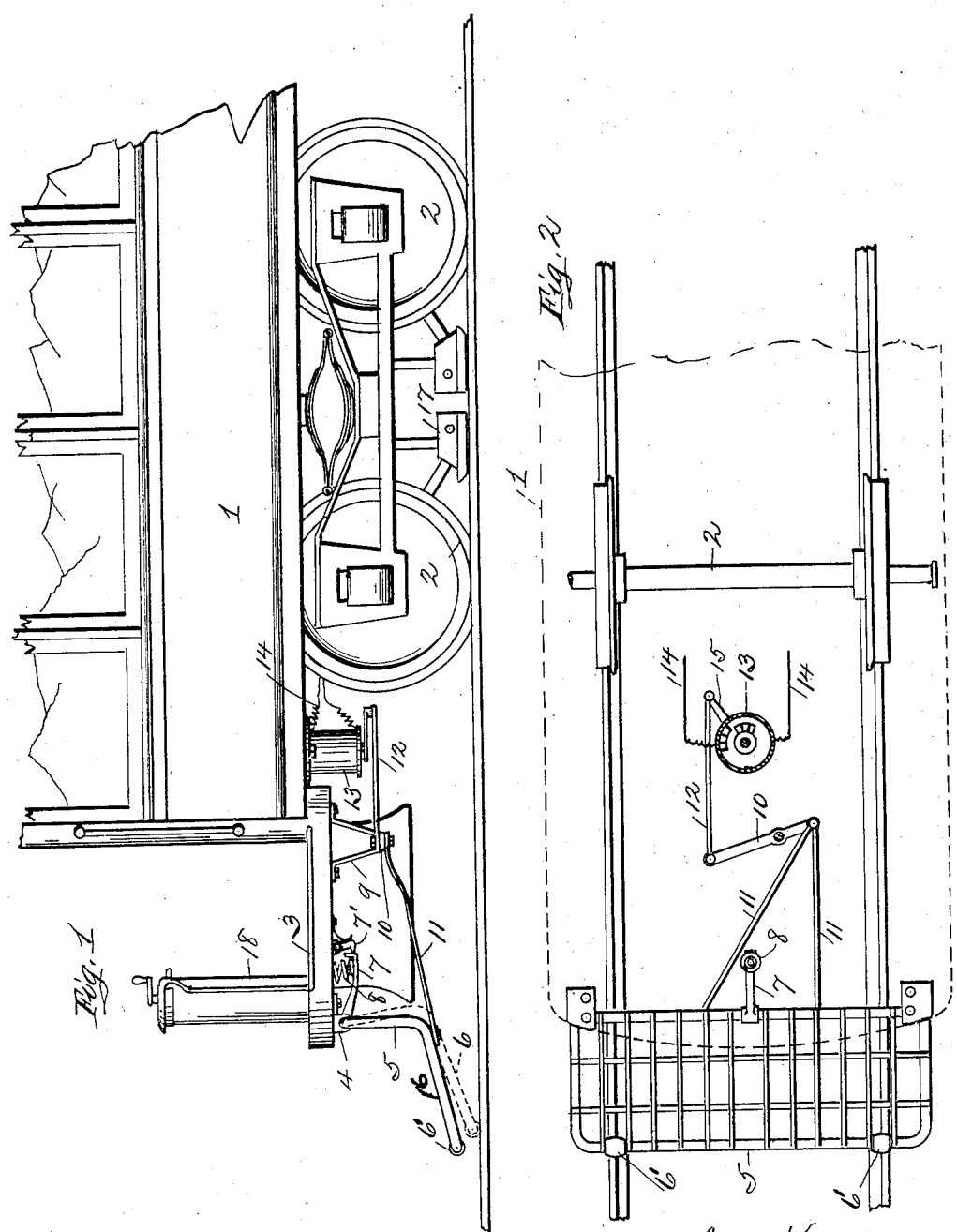

No. 738,900. Patented September 15, 1903.

UNITED STATES PATENT OFFICE.

WILLIAM K. GIVEN, OF PITTSBURG, PENNSYLVANIA.

AUTOMATIC CAR-FENDER WITH BRAKE ATTACHMENT.

SPECIFICATION forming part of Letters Patent No. 738,900, dated September 15, 1903.

Application filed January 2, 1903. Serial No. 137,430. (No model.)

*To all whom it may concern:*

Be it known that I, WILLIAM K. GIVEN, a citizen of the United States, residing at Pittsburg, in the county of Allegheny and State of Pennsylvania, have invented a new and useful Improvement in Automatic Car-Fenders with Brake Attachment, of which improvement the following is a specification.

My invention relates to an improved automatic-operated car-fender with brake attachment; and it consists in the certain details of construction and combination of parts, as will be fully described hereinafter.

In the accompanying drawings, Figure 1 is a side elevation of a portion of an ordinary street-car, showing my improved fender with brake attachment, the same being constructed and arranged in accordance with my invention. Fig. 2 is a plan view of the same having the car-body removed therefrom.

To put my invention into practice with a street-railway car 1 or other vehicle mounted in the usual manner upon trucks 2 and equipped with brakes 17, operated by electrical power in a manner well known in the art, I arrange at the front of the car a tubular L-shaped frame 6, hinged to suitable brackets 4, attached beneath the floor of the platform 3. This frame is covered with lattice-strips and is fitted with rollers 6' at the front, which engage with the track when the fender is down. Attached at a point near the center of the top of the fender-frame 5 is a rearwardly-extending arm 7, fitted with a spring 8, bearing against the car-body and adapted to keep the fender in its normal position a short distance above the track. Placed at the rear end of this arm 7 is a spring-actuated catch 7', which when the fender is down the said catch will engage with the said arm and lock the fender in this position. Arranged beneath the platform 3 is a bracket 9, to which a lever 10 is pivoted and the one end of the said lever 10 loosely connected to the fender 5. The other end of the lever 10 is connected by a rod 12 to a crank 15, operating a small controller 13, and the said controller by means of conductor 14 connected to the brake mechanism 17, the said mechanism being of any well-known type now in common use. These wires 14, connecting the brake-controller 13, are in circuit with the controller 18, operating the motive power of the car 1 in a manner that when the fender 5 is moved back by reason of coming in contact with an object on the track will break the circuit to the said controller 18, thereby shutting off the power and also applying the brakes.

In operation the fender 5 is at its normal position, (shown at Fig. 1 of the drawings,) and should the same be brought in contact with any object on the track the said fender will move back and occupy a position such as shown in dotted lines on the said figure and locked in this position by the spring-actuated pawl 7'. This movement of the fender 5 is transmitted, by means of the levers and connecting-rods, to the controller 13 to apply the brakes and also break the circuit to the power-controller 18.

Various slight modifications and changes may be made in the details of construction, such as placing the fender end mechanism entirely beneath the car-body, or the fender may be extended upward along the dashboard, or the lower portion of the fender may be made to move in and out if objections are made to that portion projecting beyond the front of the car, these and other modified forms to suit varying conditions without departing from the spirit of the invention. Therefore I do not limit myself to those shown and described.

Having thus described my invention, what I claim, and desire to secure by Letters Patent, is—

In a device of the character described the combination with a car-body, of a fender pivotally secured thereto, a spring-pressed lever secured to and normally holding the fender in a slightly-elevated position, locking means for securing the fender in a lowered position, a brake-controller, means for operating the same, upon movement of the fender, said means comprising a supporting-bracket, a pivoted lever carried by said bracket, connecting means between said lever and fender, a crank pivotally connected to the outer end of the lever and to the brake-controller, and a means connected to the said controller for breaking the circuit of a power-controller, substantially as described.

In testimony whereof I have hereunto signed my name in the presence of two subscribing witnesses.

WILLIAM K. GIVEN.

In presence of—
JOHN M. RALSTON,
M. E. HARRISON.